United States Patent
Khoshnood et al.

(10) Patent No.: US 9,847,671 B2
(45) Date of Patent: Dec. 19, 2017

(54) POWER SUPPLY FOR FAULTED CIRCUIT INDICATOR

(71) Applicant: Thomas & Betts International, LLC, Wilmington, DE (US)

(72) Inventors: Bahman Khoshnood, Boca Raton, FL (US); Srinivas Karnakanti, Nizamabad (IN); David Martin, Okeechobee, FL (US); William J. Dodds, Hackettstown, NJ (US); Eugene Bright, Boca Raton, FL (US); Jagadish Reddy Putta, Hyderabad (IN); Camilo Delgado, Long Island City, NY (US)

(73) Assignee: Thomas & Betts International LLC, Wilmington, DE (US)

(*) Notice: Subject to any disclaimer, the term of this patent is extended or adjusted under 35 U.S.C. 154(b) by 342 days.

(21) Appl. No.: 14/680,365

(22) Filed: Apr. 7, 2015

(65) Prior Publication Data
US 2015/0295453 A1    Oct. 15, 2015

Related U.S. Application Data

(60) Provisional application No. 61/978,571, filed on Apr. 11, 2014.

(51) Int. Cl.
*H02J 9/06* (2006.01)
*H02J 7/02* (2016.01)
*H02J 5/00* (2016.01)

(52) U.S. Cl.
CPC ............... *H02J 9/06* (2013.01); *H02J 5/005* (2013.01); *H02J 7/025* (2013.01)

(58) Field of Classification Search
CPC ............... H02J 9/06; H02J 5/005; H02J 7/025
(Continued)

(56) References Cited

U.S. PATENT DOCUMENTS

| 4,254,374 A | 3/1981 | Trihus |
| 4,963,819 A | 10/1990 | Clarke et al. |

(Continued)

FOREIGN PATENT DOCUMENTS

| EP | 2682309 A1 | 1/2014 |
| WO | 0189055 A1 | 11/2001 |

(Continued)

*Primary Examiner* — Brandon S Cole
(74) *Attorney, Agent, or Firm* — Taft Stettinius & Hollister LLP

(57) ABSTRACT

A faulted circuit indicator includes a microprocessor or discrete logic to determine a fault condition and initiate one or more fault indications, a super capacitor, a battery, and power supply circuitry for providing power to the microprocessor and one or more fault indicators. The power supply circuitry: inductively receives energy from a power line; determines whether an induced voltage is sufficient to power one or more functions of the FCI device; and if not, determines whether available voltage from the super capacitor is sufficient to power the one or more functions of the FCI device. If so, the power supply circuitry draws voltage from the super capacitor and, if not, the power supply circuitry draws voltage from the battery when it is determined that the available voltage from the super capacitor is not sufficient to power the one or more functions of the FCI device.

18 Claims, 4 Drawing Sheets

(58) Field of Classification Search
USPC .................................................. 307/11–87
See application file for complete search history.

(56) References Cited

U.S. PATENT DOCUMENTS

| | | | |
|---|---|---|---|
| 4,998,098 A | 3/1991 | Schweitzer, III | |
| 5,008,651 A | 4/1991 | Schweitzer, Jr. | |
| 5,420,502 A | 5/1995 | Schweitzer, Jr. | |
| 5,561,380 A | 10/1996 | Sway-Tin et al. | |
| 5,565,783 A | 10/1996 | Lau et al. | |
| 5,754,383 A | 5/1998 | Huppertz et al. | |
| 5,821,869 A | 10/1998 | Schweitzer, Jr. | |
| 5,889,399 A | 3/1999 | Schweitzer, Jr. | |
| 6,016,105 A | 1/2000 | Schweitzer, Jr. | |
| 6,133,723 A | 10/2000 | Feight | |
| 6,429,661 B1 | 8/2002 | Schweitzer, Jr. | |
| 6,433,698 B1 | 8/2002 | Schweitzer, Jr. et al. | |
| 6,734,662 B1 | 5/2004 | Fenske | |
| 6,963,197 B1 | 11/2005 | Feight et al. | |
| 7,023,691 B1 | 4/2006 | Feight et al. | |
| 7,053,601 B1 | 5/2006 | Fenske et al. | |
| 7,295,133 B1 | 11/2007 | McCollough, Jr. | |
| 7,630,181 B2 | 12/2009 | Wilk et al. | |
| 7,705,567 B2 | 4/2010 | Okamura et al. | |
| 7,710,069 B2 | 5/2010 | McCollough | |
| 7,764,067 B2 | 7/2010 | Lindsey | |
| 7,768,237 B2 | 8/2010 | Tarchinski | |
| 8,065,099 B2 | 11/2011 | Gibala et al. | |
| 8,274,175 B2 | 9/2012 | Tabell | |
| 2002/0008507 A1 | 1/2002 | Schweitzer et al. | |
| 2007/0086135 A1 | 4/2007 | Swartzendruber et al. | |
| 2008/0010528 A1 | 1/2008 | Park et al. | |
| 2009/0015196 A1 | 1/2009 | Baxter et al. | |
| 2009/0219163 A1 | 9/2009 | Feight | |
| 2009/0251308 A1 | 10/2009 | Schweitzer, III et al. | |
| 2011/0001485 A1* | 1/2011 | Feight | H02J 1/10 324/500 |
| 2012/0146661 A1* | 6/2012 | Thomas | H01F 38/30 324/542 |
| 2012/0209547 A1 | 8/2012 | Katsoulis | |
| 2013/0096539 A1 | 4/2013 | Wood et al. | |
| 2013/0236785 A1* | 9/2013 | Zhou | H01G 11/36 429/217 |
| 2014/0064162 A1* | 3/2014 | Swartzendruber | H04W 52/0261 370/311 |
| 2014/0097758 A1* | 4/2014 | Recker | H05B 37/0272 315/152 |
| 2016/0105239 A1* | 4/2016 | Henry | H04B 3/52 398/116 |

FOREIGN PATENT DOCUMENTS

| | | |
|---|---|---|
| WO | 2010027559 A1 | 3/2010 |
| WO | 2011036867 A1 | 3/2011 |

* cited by examiner

POWER SUPPLY FOR FAULTED CIRCUIT INDICATOR

CROSS-REFERENCE TO RELATED APPLICATION

This application claims priority under 35 U.S.C. §119, based on U.S. Provisional Patent Application No. 61/978,571, filed Apr. 11, 2014, the disclosure of which is hereby incorporated by reference herein.

BACKGROUND OF THE INVENTION

Faulted circuit indicators (FCIs) may be attached to power lines and used to detect electrical faults in power distribution systems. In general, FCI devices include high current trip devices that display whether a fault has occurred between the indicator and a load. Such devices operate by responding to fluxes generated by currents in a line. Typical FCI devices include current sensors comprising a magnetic core and a surrounding coil winding. To sense the current, the power line functions as a transformer primary and the coil winding functions as a transformer secondary. A microprocessor receives a value corresponding to the sensed current and determines whether the value exceeds a threshold. If so, the microprocessor trips an indicator accordingly.

In particular, the FCI may detect anomalies in the current and/or voltage of the power line signal, and provide an indication of fault to technicians working to isolate the location of a malfunction in the power distribution system. The indication of a detected fault may be provided, for example, in a visual manner using a mechanical indicator (e.g., a magnetically rotated "flag") and/or an optical indicator (e.g., a blinking Light Emitting Diode (LED), etc.). However, a technician may require a clear line of sight and a close proximity to the FCI in order to reliably observe the visual fault detection indicators "in the field." In some instances, FCIs also include wireless (i.e., radio frequency) communication capabilities to quickly report the indication of a detected fault to a remote station without the having to be observed in the field by a technician.

Regardless of the manner in which a fault is indicated, operating the indicator mechanism(s) of an FCI in the absence of or in the event of an insufficiency of current flowing though the power line requires the use of a finite external power supply, such as a battery. Accordingly, maximizing the lifespan of such a power supply correspondingly increases the usable life of the FCI.

DETAILED DESCRIPTION OF EMBODIMENTS

The following detailed description refers to the accompanying drawings. The same reference numbers in different drawings may identify the same or similar elements.

Embodiments described herein are directed to faulted circuit indicators (FCIs) that incorporate a power supply that includes a super capacitor and a battery operating in tandem. Specifically, each of the FCIs includes components for selectively receiving operating current from one of, a current transformer powered by the magnetic field induced by the power line, a super capacitor, and a battery. In particular, the FCI monitors a voltage induced by the power line and determines whether the amount of current available is insufficient to meet the requirements of the FCI. As described herein, this insufficiency may be based on a fault in the power line (e.g., a disruption in the power line), low current flow through the transmission line, or may be based on increases requirements on the part of the FCI. When such an insufficiency is determined, the FCI utilizes energy from the super capacitor to power the FCI and, when the energy from the super capacitor falls below a predetermined threshold, the FCI utilizes energy from the battery to power the FCI. Once the voltage induced by the power line regains sufficiency for powering the FCI, the energy use from the battery and/or super capacitor are suspended and the super capacitor resumes a charging state.

As used herein, the term super capacitor (also referred to as a "supercapacitor") refers to any of a family of capacitor devices that operate in an area between those of conventional capacitors and rechargeable batteries. More specifically, super capacitors generally store have higher energy densities than most traditional capacitors, yet significantly lower energy densities that conventional batteries due to increases power densities. Thus, super capacitors obtain much shorter charge/discharge cycles than conventional rechargeable batteries and additionally tolerate many more charge and discharge cycles than such batteries.

Figure 1:
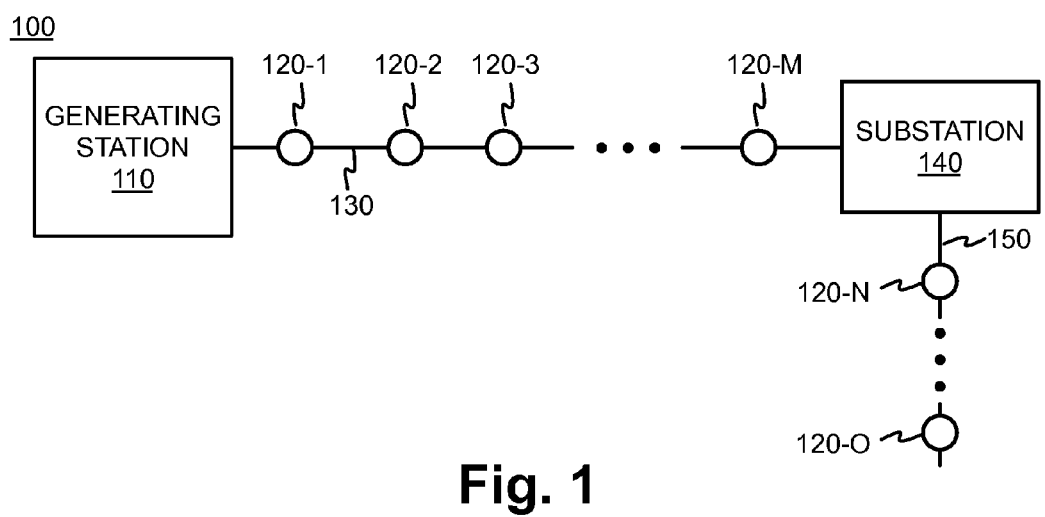
FIG. 1 is an illustration of an exemplary environment implementing faulted circuit indicators (FCIs)

FIG. 1 is an illustration of an exemplary power distribution environment 100 implementing faulted circuit indicators (FCIs) that synchronize transmissions based on a power line signal. Power distribution environment 100 may include a generating station 110, a plurality of FCIs 120 (herein referred to collectively as "FCIs 120" and individually as FCI 120-x"), a transmission line 130, a substation 140, and a distribution line 150. Power distribution environment 100 may be part of a larger power distribution system, and may include additional or different entities in alternative configurations than which are exemplified in FIG. 1.

Generating station 110 may transmit power on transmission lines 130 over long distances, which may terminate substation 140. High voltages, e.g., 66 kV and above (e.g., 110 kV), may be employed in transmission lines 130 to improve efficiencies of the delivery of electric power. Accordingly, for safety reasons, transmission lines 130 may be suspended high off the ground using transmission towers. FCIs 120-1 through 120-M may be mounted directly on transmission lines 130 using spacing consistent with conventional power monitoring systems, and at distances which permit radio communications at least between adjacent FCIs 120. While the spacing shown in FIG. 1 between FCIs 120 appears to be the same, the lengths between adjacent FCIs 120 do not have to be the equidistant. Given the height of transmission lines 130 and the magnitude of the voltages being transferred, access to FCIs 120-1 through 120-M for maintenance, such as battery replacement, can be difficult and hazardous. As such, it can be desirable so minimize the maintenance each FCI 120 requires. Transmission lines 130 may terminate at substation 140, which may step-down the high voltage provided over transmission lines 130 for distribution to various classes of customers, such as, for example, sub-transmission customers, primary customers, and/or secondary customers (such as, for example, homes and small businesses). Accordingly, distribution lines 150 may employ lower voltages, ranging from 33 kV to 66 kV. Distribution lines 150 leading from substation 140 may also be monitored with a plurality of FCIs 120-N through 120-0, which may be suspended directly from distribution lines 150. As used herein, the term "power line" may be used to designate any type of conducting line used to transmit power. Accordingly, both transmission line 130 and distribution line 150 may be referred to as "power lines."

FCIs 120 may be used to locate earth-faults or short-circuits in a power distribution system. Each of FCIs 120 may constantly monitor the power line for earth-fault and/or short-circuit conditions. As soon as a fault current higher than the trip value is detected, the fault will be indicated. To avoid false indications, FCIs 120 may sample and analyze the measured fault signal using a microcontroller, as will be explained in more detail below.

Figure 2:
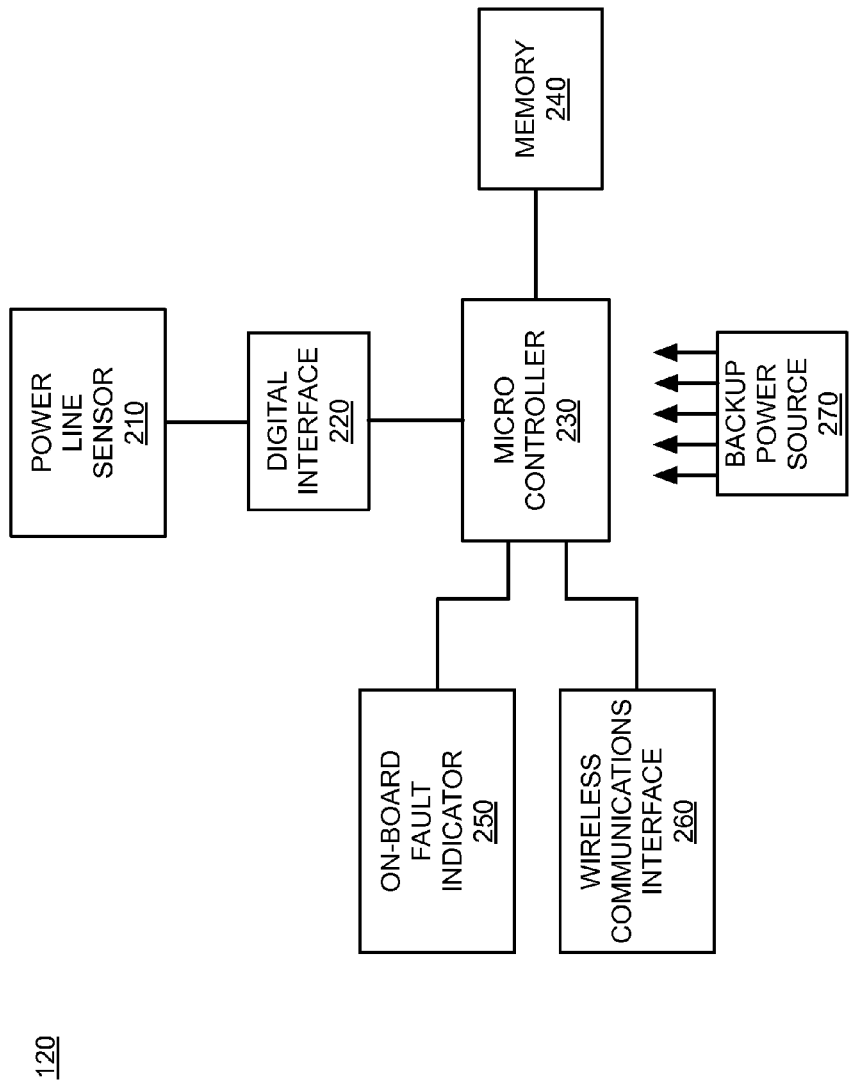
FIG. 2 is a block diagram depicting exemplary components for an FCI according to an embodiment.

FIG. 2 is a block diagram depicting exemplary components for an FCI 120 according to an embodiment. FCI 120 may include a microcontroller 230, memory 240, a power line sensor 210, a digital interface 220, a wireless communication interface 260, an on-board fault indicator 250, and a supplemental power source 270.

Microcontroller 230 may include a processor, microprocessor, or processing logic that may interpret and execute instructions. Alternatively, microcontroller 230 may include dedicated hardware, such as an ASIC, for performing logical and/or mathematical operations. Microcontroller 230 may interface to other components using a bus (not shown) or through other interfaces, which may be dedicated to particular on-board devices. Memory 240 may include a random access memory (RAM), read only memory (ROM), and/or any other type of storage device that may store information and instructions for execution by microcontroller 430. Memory 240 may be integrated with microcontroller 230 in a common package, or may be housed externally, or a combination thereof.

Power line sensor 210 may be used to sense a power signal from power line 130/150. In an embodiment, power line sensor 210 may use an inductive coupling to generate a sensing signal representative of the power line signal for both powering FCI 120 and for detecting a fault in power line 130/150. As described above, typical FCI devices include current sensors that include high permeability alloy core and a surrounding coil winding that acts as a transformer secondary in cooperation with the power line, which functions as the transformer primary. In some embodiments, the sensing signal may be provided to a digital interface 220 so it may be sampled and digitized for use by microcontroller 230 for analysis. In some embodiments, power line sensor 210 and digital interface 220 may be combined into a signal unit.

Wireless communication interface 260 may communicate with other FCIs 120 and/or directly with one or more other remote devices over one or more wireless channels. In some embodiments, FCIs 120 may operate in full duplex mode, thus having multiple channels that use frequency division multiplexing and/or code division multiplexing, for example, to avoid cross talk interference. The type of wireless channel may depend on the environment in which FCIs 120 are operating. In an embodiment, where FCIs 120 are coupled to power lines 130/150 suspended from transmission towers, communications interface 260 may be based on any suitable wireless communication, in including wireless local area networking (e.g., RF, infrared, and/or visual optics, etc.) and/or wireless wide area networking (e.g., WiMaxx, cellular technologies including GPRS, 3G, HSxPA, HSPA+, LTE, etc.). Wireless communication interface 260 may include a transmitter that converts baseband signals to RF signals and/or a receiver that converts RF signals to baseband signals. Wireless communication interface 260 may be coupled to one or more antennas for transmitting and receiving RF signals. In other environments, wireless communications interface 260 may rely on wireless communications based low frequency electromagnetic carriers and/or acoustic carriers (for penetrating ground and/or water), and have the appropriate hardware and transducers for transmitting and receiving over a range of frequencies and/or waveform types (electromagnetic and/or acoustic).

On-board fault indicator 250 may include conventional fault indicators, such as, for example, electromagnetically triggered flags, and/or LED indicators. Having conventional indictors in addition to those provided over the wireless channels may be useful when technicians are trouble-shooting the power distribution system in the field.

As described herein, supplemental power source 270 may be used to power the components in FCI 120 when no power line signal is present, or as an additional source of power, if needed. FCI 220 may inductively draw power from power line 130/150 during normal operations, which may power the initial components and also, in some implementations, charge one or more components of supplemental power source 270. In particular, as described in additional detail below, supplemental power source 270 may include both a chargeable and depletable super capacitor and a finite capacity battery.

FCIs 120 may perform certain operations or processes, as may be described below in relation to FIG. 4. FCIs 120 may perform these operations in response to microcontroller 230 executing instructions contained in a computer-readable medium, such as memory 240, or as hardwired into components of FCI 120. A computer-readable medium may be defined as a physical or logical memory device. A logical memory device may include memory space within a single physical memory device or spread across multiple physical memory devices. The instructions may be read into memory 240 from another computer-readable medium or from another device via wireless communication interface 260. The instructions contained in memory 240 may cause microcontroller 230 to perform operations or processes that will be described in detail with respect to FIG. 4. Alternatively, hardwired circuitry may be used in place of or in combination with software instructions to implement processes consistent with the principles of the embodiments. Thus, exemplary implementations are not limited to any specific combination of hardware circuitry and software.

The configuration of components of FCI 120 illustrated in FIG. 2 is for illustrative purposes only. It should be understood that other configurations may be implemented. Therefore, FCI 120 may include additional, fewer and/or different components than those depicted in FIG. 2.

Figure 3:
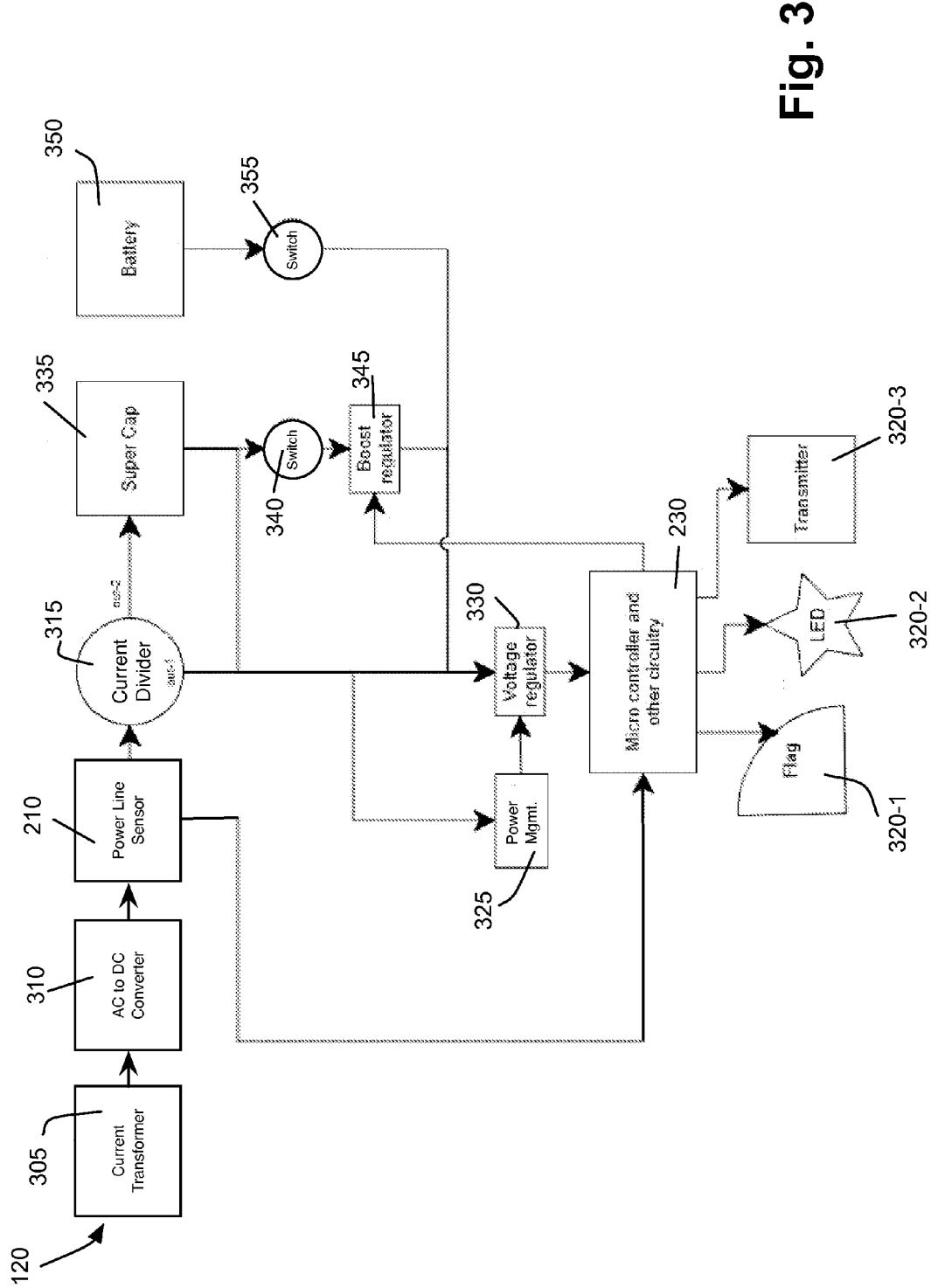
FIG. 3 is a block diagram depicting an exemplary power supply according to an embodiment.

FIG. 3 is a block diagram depicting exemplary power supply components of FCI 120 according to an exemplary embodiment. As shown, FCI 120 may include a current transformer 305, an alternating current (AC) to direct current (DC) converter 310, a current divider 315, power current line sensor 210, microcontroller or discrete logic 230, fault indicators 320-1 to 320-3, power management entity 325, voltage regulator 330, super capacitor 335, switch 340, boost regulator 345, battery 350, and switch 355.

Figure 4:
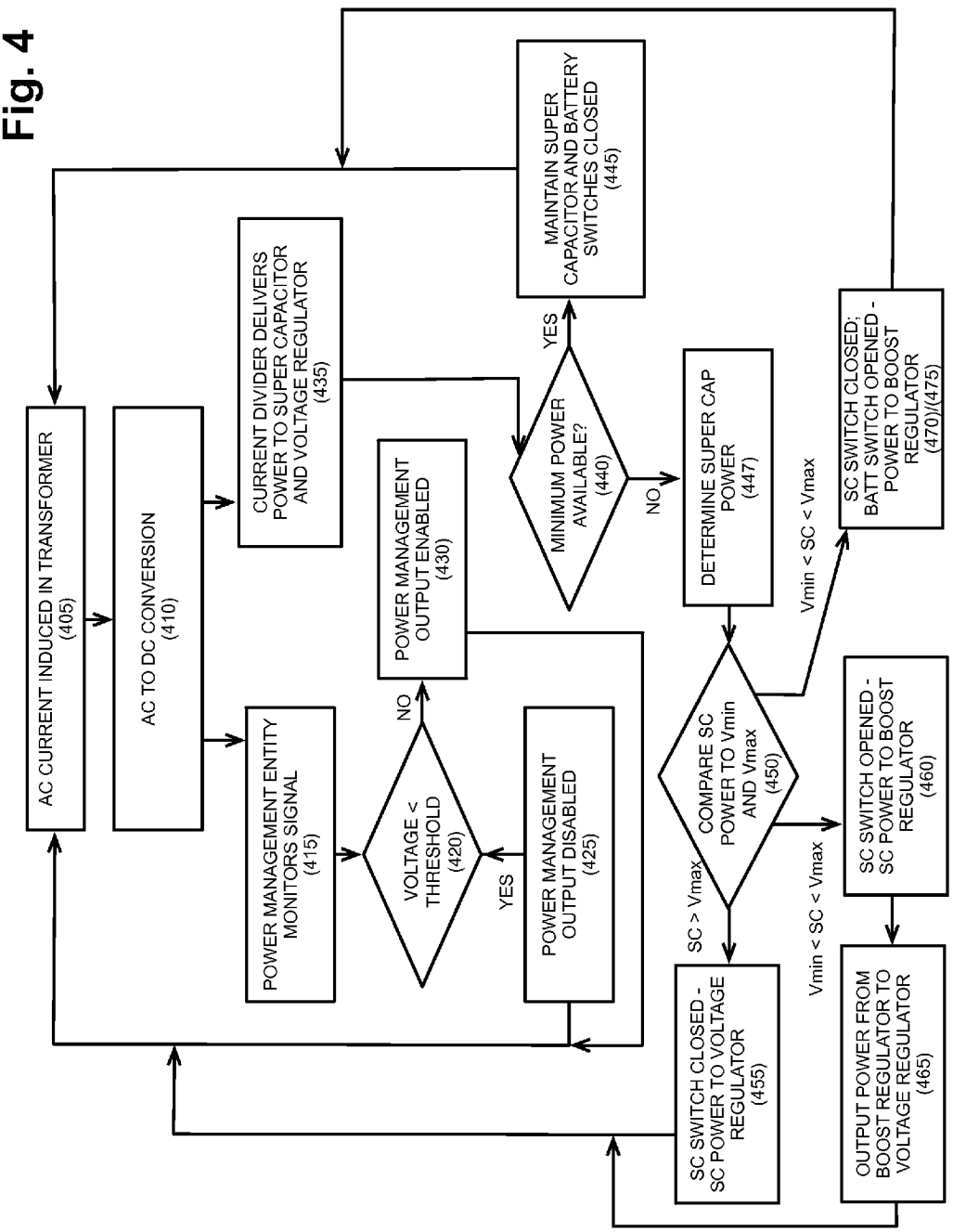
FIG. 4 is a flow chart illustrating an exemplary process of powering an FCI in accordance with embodiments described herein.

FIG. 4 is a flow chart showing an exemplary process of powering FCI 120 using the power supply components of FIG. 3. Functions of the components of the power supply arrangement of FIG. 3 and the corresponding processing of FIG. 4 will be described together, where appropriate.

Power supply processing may begin when a magnetic field generated by the power line induces an alternating electric current in current transformer 305 of FCI 120 (e.g., the coil winding with the high permeability alloy core positioned adjacent to the power line, in a closed loop or open loop configuration) (block 405). The induced alternating current generates a corresponding voltage due to impedances in the output of the current transformer. AC to DC converter 310 rectifies the AC voltage and outputs a corresponding DC signal (block 410). Power management entity 325 monitors the voltage corresponding to output DC signal (block 415), and determines whether the voltage is below a predetermined threshold (block 420). In some embodiments, the predetermined voltage threshold corresponds to a minimum power requirement of voltage regulator 330 and/or microprocessor 230. When power management entity 325 determines that the voltage is below the predetermined threshold (block 420—YES), an output of power management entity 325 is disabled (425), thus preventing power-on of voltage regulator 330 and microprocessor 230. Processing then returns to block 405. This prevents high current consumptions by the processors and other circuits, during the relatively slow rise time of the power supply voltage, or when the minimum voltage required for voltage regulator 330 has not been met. This will enable microprocessor 230 to start to operate at lower magnetic field levels by transmission line 130

Once power management entity 325 determines that the monitored voltage exceeds the minimum threshold (block 420—NO), output from power management entity 325 is enabled, and voltage regulator 330 and microprocessor 230 are powered up or otherwise activated (block 430). As used herein, the term "voltage regulator" refers to a device or component for receiving a signal of variable voltage and outputting a consistent voltage via a step-down operation.

Concurrently with steps 415-430 described above, current divider 315 also receives the signal output by AC to DC converter 310 and delivers power to both voltage regulator 330 and super capacitor 335 in a ratio determined by the relative impedance of each of voltage regulator 330 and super capacitor 335 (block 435). For example, when voltage regulator 330 is inactive (e.g., before activation by power management entity 325) or when microprocessor 330 is operating in a low-power or sleep state, voltage regulator 330 has high impedance and super capacitor 335 has relatively lower impedance. In this scenario, current divider 315 operates to output current from AC to DC converter 310 to super capacitor 335, thus charging super capacitor 335. Conversely, when voltage regulator 330 (and microprocessor 230) is active, voltage regulator 330 has lower impedance relative to super capacitor 335. In this scenario, current divider 315 operates to deliver current from AC to DC converter 310 to both voltage regulator 330 and super capacitor 335 in a ratio that is based on their relative impedances.

Accordingly, when voltage regulator 330 (and microprocessor 230 which draws power via voltage regulator 330), require less than 100% of the available current from AC to DC converter 310, the remaining amount of current is directed to super capacitor 335. It is noted that when super capacitor 335 is fully charged, excess current may be converted to heat and dissipated.

Consistent with embodiments described herein, microprocessor (or discrete logic) 230 determines whether a minimum amount of power is available from voltage regulator 330 to power required processing components, such as powering one of fault indicators 320, etc. (block 440). If sufficient power is available via voltage regulator 330 (block 440—YES), microprocessor 230 switches 340 and 355 remain closed and all processing power requirements are satisfied by power from voltage regulator 330 (block 445).

However, when microprocessor 230 determines that a minimum amount of power is not available via voltage regulator 330 (block 440—NO), such as when a high power operation (e.g., RF transmission) is required or when there is no current flowing through power lines 130/150, microprocessor 230 determines a value for the voltage of the signal received from super capacitor 335 (block 447) and determines whether that value meets or exceeds a minimum threshold voltage and whether it exceeds a maximum threshold voltage (block 450).

If the signal exceeds a maximum voltage (block 450—"SC>Vmax"), switch 340 remains closed and power from super capacitor is directed to voltage regulator 330, without passing through boost regulator 345 (block 455). However, if the voltage from super capacitor 335 does not exceed the maximum voltage, but exceeds the minimum voltage for the boost regulator 345 (block 450—"Vmin<SC<Vmax"), microprocessor 230 opens switch 340, thus allowing power from super capacitor 335 to flow into boost regulator 345 (block 460). In some embodiment, the minimum voltage for boost regulator 345 may include a minimum voltage necessary to ensure operation of a highest power function of microprocessor 230 or fault indicators 320, such as the RF transmitter. Power is then output from boost regulator 345 to voltage regulator 330 for delivery to microprocessor 230 (block 465). In this mode, the power is supplied by super capacitor 335, until the power no longer meets the minimum requirement of the boost converter M. Processing then returns to block 415 for monitoring of the incoming power from power line 135/150. As used herein, the term "boost regulator" refers to a device or component for receiving a signal of variable voltage and outputting a consistent voltage via a step-up operation.

When the voltage received from super capacitor 335 does not meet or exceed the minimum threshold voltage (block 450—"SC<Vmin), microprocessor 230 deactivates switch 340 and activates switch 355 (block 470). Power is then output from battery 350 to voltage regulator 330 for delivery to microprocessor 230 (block 475). In this mode, power is output from battery 350 to voltage regulator 330 for delivery to microprocessor 230. Processing then returns to block 415 for monitoring of the incoming power from power line 135/150.

Consistent with implementations described herein, all circuits (e.g., switches 340 and 355, microprocessor 230, etc.) are placed into a low power sleep mode when they are not in an active supply mode.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while the series of blocks have been described in FIG. 4, the order of blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for powering a faulted circuit indicator (FCI) device, comprising:
   inductively receiving energy from a power line to which the FCI device is in proximity to;
   monitoring an induced voltage corresponding to the received energy;
   determining whether the induced voltage is sufficient to power one or more functions of the FCI device;
   determining whether available voltage from a super capacitor is sufficient to power the one or more functions of the FCI device, when it is determined that the induced voltage is not sufficient to power the one or more functions of the FCI device, the determining whether the available voltage from a super capacitor is sufficient to power the one or more functions of the FCI device further comprising:
      determining whether the available voltage from the super capacitor exceeds a boost maximum voltage, and
      forwarding the voltage from the super capacitor to a voltage regulator for powering the one or more functions of the FCI device when the available voltage from the super capacitor exceeds the boost maximum voltage;
   drawing power from the super capacitor when it is determined that the available voltage from the super capacitor is sufficient to power the one or more functions of the FCI device; and
   drawing power from a battery when it is determined that the available voltage from the super capacitor is not sufficient to power the one or more functions of the FCI device.

2. The method of claim 1, wherein the FCI device is physically coupled to the power line.

3. The method of claim 1, wherein the one or more functions of the FCI device comprise at least one of fault monitoring or fault indication.

4. The method of claim 3, wherein the fault indication comprises at least one of a mechanical fault indication, an optical fault indication, or a radio frequency fault transmission indication.

5. The method of claim 1, wherein the determining whether available voltage from a super capacitor is not sufficient to power the one or more functions of the FCI device is indicative of a power line fault condition.

6. The method of claim 1, further comprising:
   determining whether the induced voltage meets a minimum threshold voltage;
   activating a processor of the FCI device when the induced voltage meets a minimum threshold voltage; and
   maintaining the processor in a deactive state when the induced voltage does not meet the minimum threshold voltage.

7. The method of claim 1, further comprising:
   forwarding a first portion of the receiving energy to a voltage regulator for powering the one or more functions of the FCI device and a second portion of the received energy to the super capacitor to charge the super capacitor.

8. The method of claim 7, wherein the first portion and the second portion are based on relative impedances of the voltage regulator and the super capacitor.

9. The method of claim 1, further comprising:
   forwarding the voltage from the super capacitor to the voltage regulator via a boost regulator when the available voltage from the super capacitor does not exceed the boost maximum voltage and when the available voltage from the super capacitor is sufficient to power the one or more functions of the FCI device.

10. The method of claim 1, wherein the super capacitor comprises a device having a higher energy density that a non-super capacitor, shorter charge and discharge cycle than the battery, and is able to tolerate more charge and discharge cycles than the battery.

11. A faulted circuit indicator (FCI), comprising:
    a microprocessor, or discrete logic to determine a fault condition and initiate one or more fault indications;
    a super capacitor;
    a battery; and
    power supply circuitry for providing power to the microprocessor and one or more fault indicators,
    wherein the power supply circuitry:
       inductively receives energy from a power line proximate to the FCI;
       monitors an induced voltage corresponding to the received power;
       determines whether the induced voltage is sufficient to power one or more functions of the FCI device;
       determines whether available voltage from the super capacitor is sufficient to power the one or more functions of the FCI device, when it is determined that the induced voltage is not sufficient to power the one or more functions of the FCI device;
       draws voltage from the super capacitor when it is determined that the available voltage from the super capacitor is sufficient to power the one or more functions of the FCI device; and
       draws voltage from the battery when it is determined that the available voltage from the super capacitor is not sufficient to power the one or more functions of the FCI device, and
    wherein determining whether the available voltage from a super capacitor is sufficient to power the one or more functions of the FCI device further comprises, performing by the power supply circuitry:
  determining whether the available voltage from the super capacitor exceeds a boost maximum voltage; and
  forwarding the voltage from the super capacitor to a voltage regulator for powering the one or more functions of the FCI device when the available voltage from the super capacitor exceeds the boost maximum voltage.

12. The FCI of claim 11, wherein the one or more functions of the FCI device comprise at least one of fault monitoring or fault indication.

13. The FCI of claim 12, wherein the fault indication comprises at least one of a mechanical fault indication, an optical fault indication, or a radio frequency fault transmission indication.

14. The FCI of claim 11, wherein determining whether available voltage from a super capacitor is not sufficient to power the one or more functions of the FCI device by the power supply circuitry is indicative of a power line fault condition.

15. The FCI of claim 11, wherein the power supply circuitry is further configured to:
  determine whether the induced voltage meets a minimum threshold voltage;
  activate a processor of the FCI device when the induced voltage meets a minimum threshold voltage; and
  maintain the processor in a deactive state when the induced voltage does not meet the minimum threshold voltage.

16. The FCI of claim 11, wherein the power supply circuitry is further configured to:
  forward a first portion of the receiving energy to a voltage regulator for powering the one or more functions of the FCI device and a second portion of the received energy to the super capacitor to charge the super capacitor.

17. The FCI of claim 11, wherein the power supply circuitry is further configured to:
  forward the voltage from the super capacitor to the voltage regulator via a boost regulator when the available voltage from the super capacitor does not exceed the boost maximum voltage and when the available voltage from the super capacitor is sufficient to power the one or more functions of the FCI device.

18. The FCI of claim 11, wherein the super capacitor comprises a device having a higher energy density that a non-super capacitor, shorter charge and discharge cycle than the battery, and is able to tolerate more charge and discharge cycles than the battery.

* * * * *